(12) United States Patent
Chen

(10) Patent No.: US 7,788,525 B2
(45) Date of Patent: Aug. 31, 2010

(54) FAULT TOLERANCE SYSTEM AND METHOD FOR MULTIPLE FAILED DISKS IN A DISK ARRAY

(75) Inventor: Mien-Chih Chen, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1379 days.

(21) Appl. No.: 11/172,751

(22) Filed: Jul. 1, 2005

(65) Prior Publication Data

US 2006/0005075 A1    Jan. 5, 2006

(30) Foreign Application Priority Data

Jul. 2, 2004    (TW) ............................... 93120049 A

(51) Int. Cl.
*G06F 11/00* (2006.01)
(52) U.S. Cl. .......................................................... 714/6
(58) Field of Classification Search ....................... 714/6
See application file for complete search history.

(56) References Cited

U.S. PATENT DOCUMENTS

| | | | |
|---|---|---|---|
| 5,271,012 A * | 12/1993 | Blaum et al. ................... 714/6 |
| 5,499,253 A * | 3/1996 | Lary ........................... 714/770 |
| 5,594,862 A | 1/1997 | Winkler et al. .......... 395/182.03 |
| 5,761,402 A * | 6/1998 | Kaneda et al. ................. 714/6 |
| 6,138,125 A | 10/2000 | DeMoss ...................... 707/202 |
| 6,158,017 A * | 12/2000 | Han et al. ....................... 714/6 |
| 6,738,125 B2 * | 5/2004 | Yamada et al. .............. 349/156 |
| 6,993,701 B2 * | 1/2006 | Corbett et al. .............. 714/770 |
| 7,321,905 B2 * | 1/2008 | Hartline et al. ................... 1/1 |
| 7,356,757 B2 * | 4/2008 | Chen .......................... 714/800 |
| 2004/0049632 A1 * | 3/2004 | Chang et al. ................ 711/114 |
| 2005/0050384 A1 * | 3/2005 | Horn ............................. 714/6 |
| 2006/0123268 A1 * | 6/2006 | Forhan et al. .................. 714/6 |

OTHER PUBLICATIONS

Jin Hai & Zhang Jiangling, "Placement Strategy of Parity Information in RAID", Computer Science, issued 3th edition, 1994, p. 222, Department of Computer Science and Engineering, Huazhong University of Science and Technology, Wuhan, P. R. China.

* cited by examiner

*Primary Examiner*—Robert Beausoliel
*Assistant Examiner*—Amine Riad
(74) *Attorney, Agent, or Firm*—Frank R. Niranjan

(57) ABSTRACT

A fault tolerance system for multiple failed disks in a disk array includes: a disk array (3), a processor (1), and an exclusive-or (XOR) unit (2). The disk array includes a plurality of disks (30), each of which is logically divided into multiple blocks. The blocks includes: a plurality of data blocks, which are stored in n disks and each is symbolically depicted as D(i,j); parity blocks depicted as P parity blocks and stored in an independent disk, for storing P parities which can be symbolically depicted as P(j); and parity blocks depicted as Q parity blocks and stored in another independent disk, for storing Q parities which can be symbolically depicted as Q(k). The processor is connected to the disk array through a bus (4), and is for performing modulus operations, shift operations, and address conversion operations. The exclusive-or (XOR) unit is for performing XOR operations on blocks of the disk array when generating P/Q parity or reconstructing failed data. A related method is also disclosed.

16 Claims, 9 Drawing Sheets

FAULT TOLERANCE SYSTEM AND METHOD FOR MULTIPLE FAILED DISKS IN A DISK ARRAY

CROSS-REFERENCE OF RELATED APPLICATION

This application is related to copending U.S. patent application entitled "Fault Tolerance System and Method for One or Two Failed Disks in a Disk Array" filed on Dec. 29, 2004 and accorded Ser. No. is 11/025,280.

BACKGROUND OF THE INVENTION

1. Field of the Invention

The present invention relates to computer fault tolerance systems and methods, and more particularly to a fault tolerance system and method for multiple failed disks in a disk array.

2. General Background

As users have demanded increased reliability and capacity of computer storage systems, disk array storage systems have evolved as a solution to both needs. Disk array storage systems use multiple disks, and distribute the data over multiple disks. Distributing the data over multiple disks is a process commonly referred to as "striping." Striping the data over the disks enhances performance as compared to a single disk, because smaller amounts of data are written to or read from multiple disks in parallel. The total time needed to complete a particular read or write operation is therefore reduced because multiple disks perform the operation in parallel.

However, multiplying the number of disks used to store data increases the probability of a disk failure causing loss of data. Therefore storage arrays provide additional storage, which has redundancy information used to recover data lost due to failure of other disks. A Redundant Array of Independent Disks (RAID) is a storage technology commonly used in present-day disk array storage systems. There are several "levels" of RAID technology. RAID level 6 provides for recovery from a two-disk failure using an additional parity block. The first parity block (P) is calculated with exclusive-or (XOR) operations of data blocks. The second parity block (Q) is based on Reed-Solomon codes requiring finite field computations. Such finite field computations are substantially complex and may require significant computational resources. The complexity of Reed-Solomon codes may preclude their use in certain software, or may necessitate the use of expensive special purpose hardware. Thus, implementation of Reed-Solomon codes in a disk array increases the cost and complexity of the array. Unlike the simple XOR codes, Reed-Solomon codes cannot easily be distributed among dedicated XOR processors.

What is needed, therefore, is an inexpensive and simple system for calculating P/Q parities and reconstructing multiple failed disks in a disk array.

Similarly, what is also needed is an inexpensive and simple method for calculating P/Q parities and reconstructing multiple failed disks in a disk array.

SUMMARY

A fault tolerance system for multiple failed disks in a disk array includes: a disk array, a processor, an exclusive-or (XOR) unit and a bus. The disk array comprises a plurality of disks, each of which is logically divided into multiple blocks. The blocks includes: a plurality of data blocks, the data blocks being stored in n disks, each of which can be symbolically depicted as $D(i,j)$, wherein n is any number greater than 4, i is a disk number of a disk, and j is a data block number of a disk; parity blocks which can be symbolically depicted as P parity blocks, the P parity blocks being stored in an independent disk, and being for storing P parities, which can be symbolically depicted as $P(j)$, wherein $P(j)$ is computed as an XOR of all of the data $D(i,j)$s each of which has the same block number j; and parity blocks which can be symbolically depicted as Q parity blocks, the Q parity blocks being stored in another independent disk, and being for storing Q parities, which can be symbolically depicted as $Q(k)$, wherein $Q(k)$ is computed as an XOR of all of the data $D(i,j)$s each of whose i and j meet the relationship: $k=(i+j) \mod p$, and p is a prime number. The processor is connected to the disk array through a bus, and which comprises: a modulus operation for performing a modulus operation on an operand; a shift operation unit for performing shift operations on the blocks of the disk array; and an address conversion unit address conversion unit for converting a logical address into a physical address. The XOR unit is used for performing XOR operations on blocks of the disk array when generating P/Q parity or reconstructing failed data.

Another preferred embodiment provides a fault tolerance method for multiple failed disks in a disk array. The method includes the steps of: assigning a plurality of data blocks $D(i,j)$s from operable data into n selective disks of the disk array; computing parities $P(j)$s of P parity blocks according to the corresponding data blocks in the disk array; assigning the P parity blocks into an independent disk; computing parities $Q(k)$s of Q parity blocks according to the corresponding data blocks in the disk array, wherein i, j, and k meet the relationship: $k=(i+j) \mod p$, and p is a prime number; assigning the Q parity blocks into another independent disk; and restoring data blocks of one or more failed disks in the disk array by means of utilizing the parities $P(j)$s/$Q(k)$s.

Wherein the step of computing parities $P(j)$s of P parity blocks includes the steps of: (a1) setting i and j as "0," wherein i and j respectively represent a disk number of a disk and a block number of a data block; (a2) reading a datum $D(i,j)$ from the disk array and setting $i=i+1$; (a3) determining whether i is less than n, wherein n is a number of disks for storing data $D(i,j)$s and is a number greater than 4; (a4) returning to the step (a2), if i is less than n; (a5) calculating an XOR of all data $D(i,j)$s which have the same block number j to obtain a corresponding parity $P(j)$, if i is not less than n; (a6) writing $P(j)$ into a corresponding P parity block; (a7) setting $j=j+1$ to calculate another $P(j)$; (a8) determining whether j is less than $n-1$; and (a9) returning to the step a(2), if j is less than $n-1$.

Wherein the step of computing parities $Q(k)$s of Q parity blocks includes the steps of: (b1) setting k as "0," wherein k is a parameter designated to represent a block number of a Q parity block; (b2) setting $i=k$ and $j=0$, wherein i and j respectively represent a disk number of a disk and a block number of a data block; (b3) reading a datum $D(i,j)$ whose i and j meet the relationship: $k=(i+j) \mod p$, wherein p is any prime number; (b4) setting $i=i+1$ and $j=(j+p-1) \mod p$ to read another datum $D(i,j)$; (b5) determining whether j is less than $p-1$; (b6) returning to the step (b4), if j is not less than $p-1$; (b7) determining whether i is less than n if j is less than $p-1$, wherein n is a number of disks for storing data $D(i,j)$s and is a number greater than 4; (b8) returning to the step (b3), if i is less than n; (b9) calculating an XOR of all the data $D(i,j)$s to obtain a corresponding parity $Q(k)$, if i is not less than n; (b10) writing $Q(k)$ into a corresponding Q parity block; (b11) setting k=k+1 to calculate another Q(k); (b12) determining whether k is less than p; and (b13) returning to the step (b2), if k is less than p.

Wherein the step of restoring data blocks of one failed disk in the disk array by means of utilizing the parities P(j)s/Q(k)s includes the steps of: setting a block number j as "0;" reconstructing a datum D(i,j) of the failed disk utilizing a parity P(j), wherein i is a disk number of the failed disk; or reconstructing a datum D(i,j) of the failed disk utilizing a parity Q(k), wherein k is a parameter designated to represent a block number of a Q parity block; setting j=j+1 to reconstruct another datum D(i,j); determining whether j is less than p, wherein p is a predetermined prime number; and returning to the step of reconstructing a datum D(i,j) of the failed disk utilizing a parity P(j) or to the step of reconstructing a datum D(i,j) of the failed disk utilizing a parity Q(k), if j is less than n−1.

In addition, the step of restoring data blocks of two failed disks in the disk array by means of utilizing the parities P(j)s/Q(k)s includes the steps of: setting a block number j as "0" and a parameter y=b−a−1, wherein 'b' and 'a' respectively represent disk numbers of the two failed disks, and 'a' is less than 'b;' performing the operation (a+y) mod p to obtain k; reconstructing a datum D(a,y) of the failed disk 'a' utilizing a parity Q(k); reconstructing a datum D(b,y) of the failed disk 'b' utilizing a parity P(y); performing another operation (y+(b−a)) mod p to obtain a new y, and setting j=j+1 to reconstruct another datum; determining whether j is less than n−1; and returning to the step of performing the operation (a+y) mod p to obtain k, if j is less than n−1.

In summary, the system and method can reconstruct failed data blocks to restore multiple failed disks in a disk array whose number of disks is any number greater than 4, by means of utilizing two different parities blocks.

Other advantages and novel features of the embodiments will be drawn from the following detailed description with reference to the attached drawings, in which:

DETAILED DESCRIPTION OF THE EMBODIMENTS

Figure 1:
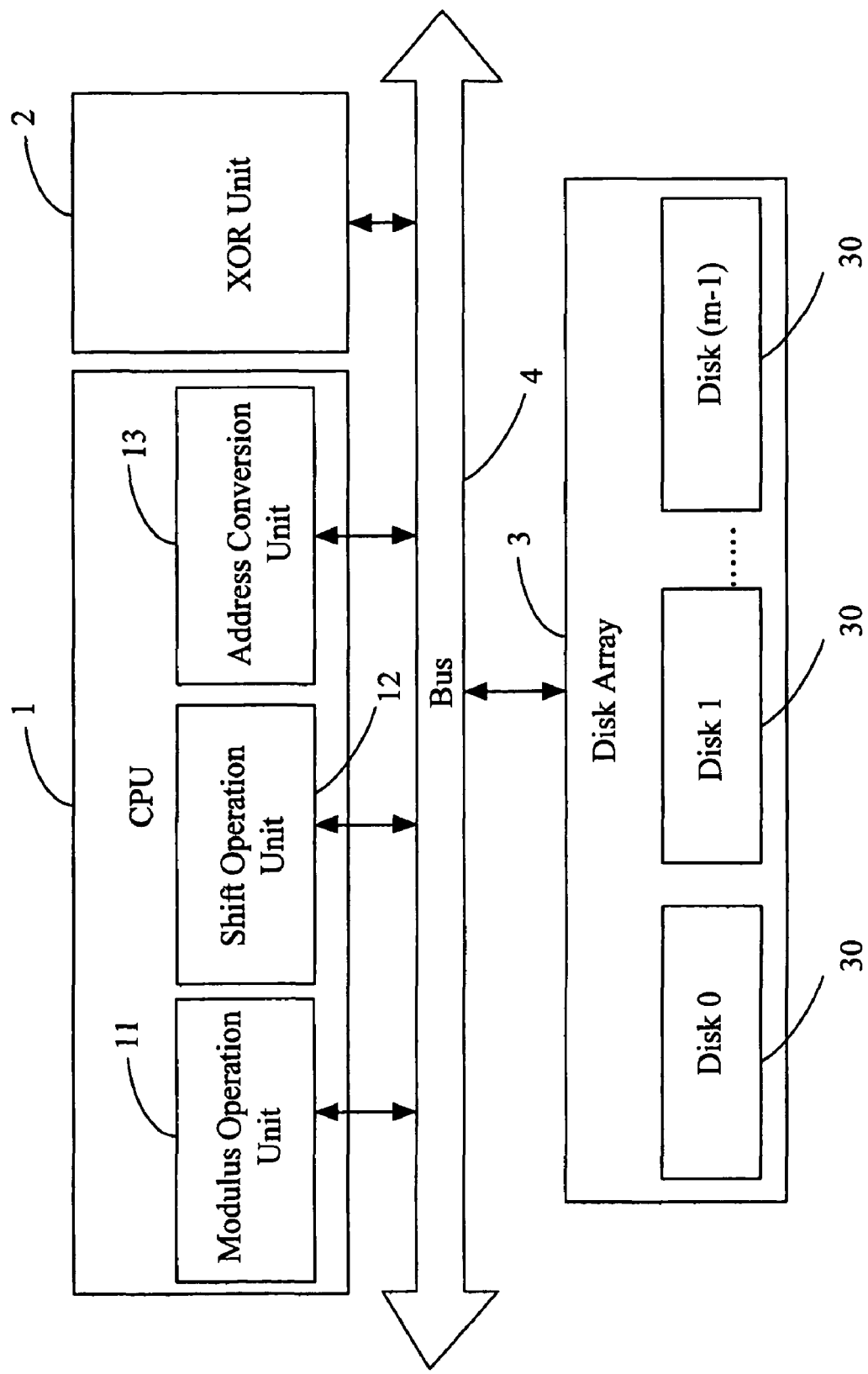
FIG. 1 is a block diagram of hardware infrastructure of a fault tolerance system for multiple failed disks in a disk array in accordance with a preferred embodiment of the present invention.

FIG. 1 is a block diagram of hardware infrastructure of a fault tolerance system for multiple failed disks in a disk array (hereinafter, "the system") in accordance with the preferred embodiment of the present invention. The system comprises a central processing unit (CPU) 1, an exclusive-or (XOR) unit 2, a disk array 3, and a bus 4. The CPU 1 comprises a modulus operation unit 11 for performing a modulus operation on an operand, a shift operation unit 12 for performing shift operations on blocks of the disk array 3, and an address conversion unit 13 for converting a logical address into a physical address. The XOR unit 2 performs an XOR operation (denoted hereinafter by the symbol "⊕") on blocks of the disk array 3. The XOR unit 2 is separate from the CPU 1, and also may be included in the CPU 1 (not shown in FIG. 1). The disk array 3 comprises m disks 30 (symbolically depicted as disk 0, disk 1, . . . , disk (m−1)), each of which is divided into a plurality of blocks. There are two additional new disks 30 (not shown in FIG. 1) in the disk array 3 for storing recovered data of failed disks. The bus 4 connects the CPU 1 and the XOR unit 2 to the disk array 3.

Figure 2:
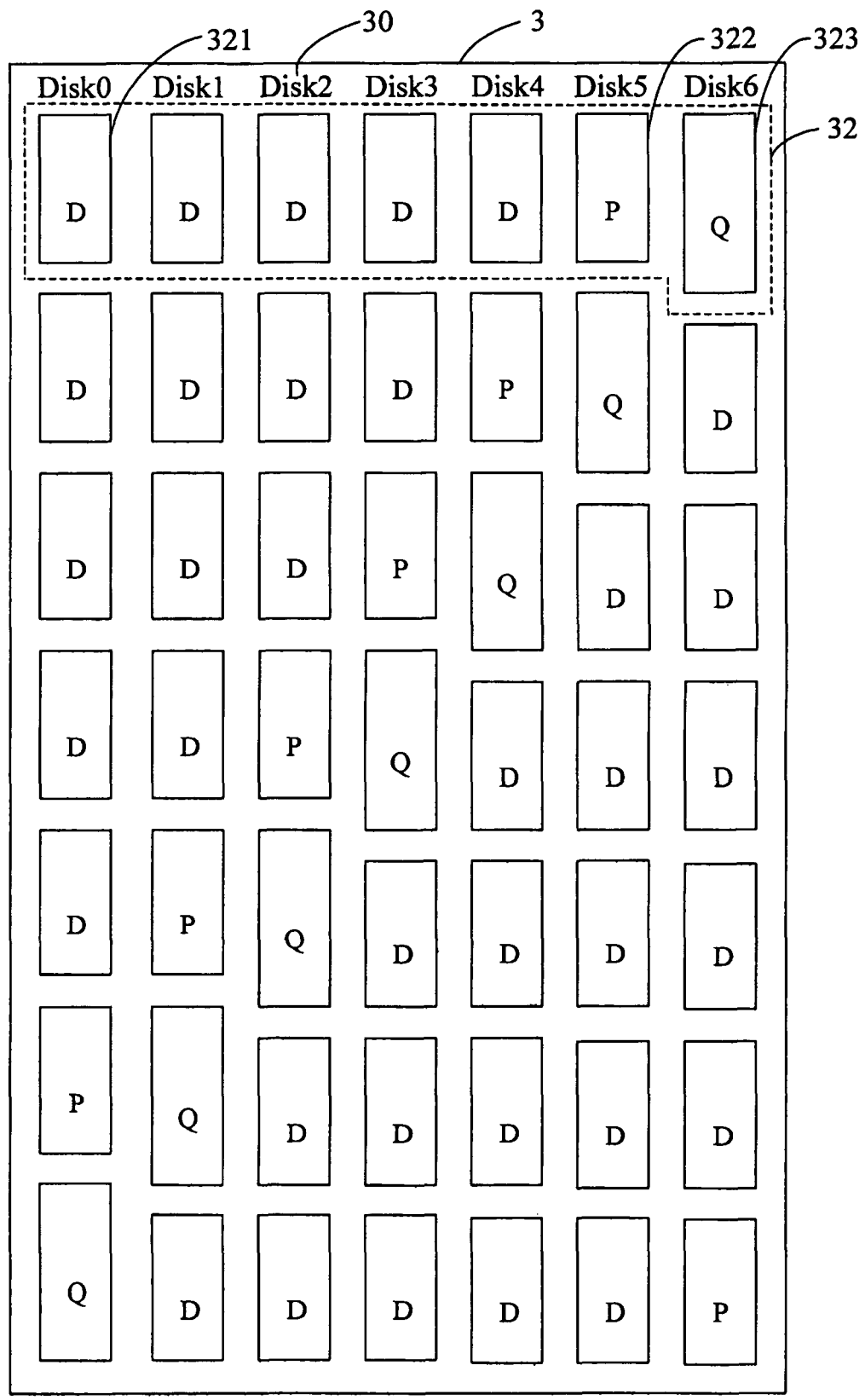
FIG. 2 is a schematic diagram showing an initial arrangement of data segments, P parity segments and Q parity segments of a disk array, and arrangements of these segments after successive shift operations have been performed.

FIG. 2 is a schematic diagram showing an initial arrangement of data segments, P parity segments and Q parity segments of a disk array, and arrangements of these segments after successive shift operations have been performed. In the preferred embodiment of the present invention, the disk array 3 contains n disks 30 to store data segments 321, and contains another two independent disks 30 to store P parity segments 322 and Q parity segments 323 respectively. That means, m=n+2. In practice, n is any number greater than 4, which is not restricted by a prime number. For convenience, in the preferred embodiment, n is 5. Nevertheless, the description should not be construed as limiting the invention to any n being particular number. Accordingly, the disk array 3 is composed of seven disks 30 (symbolically depicted as disk 0, disk 1, . . . , disk 6), as shown in the first row in FIG. 2. A data set 32 is logically composed of five data segments 321, a P parity segment 322 and a Q parity segment 323. The shift operation unit 12 can perform one or more left shift operations on the data segments 321, the P parity segments 322 and the Q parity segments 323 contained in the data set 32 according to particular requirements. The other rows in FIG. 2 show arrangements of the shift operation results.

Figure 3:
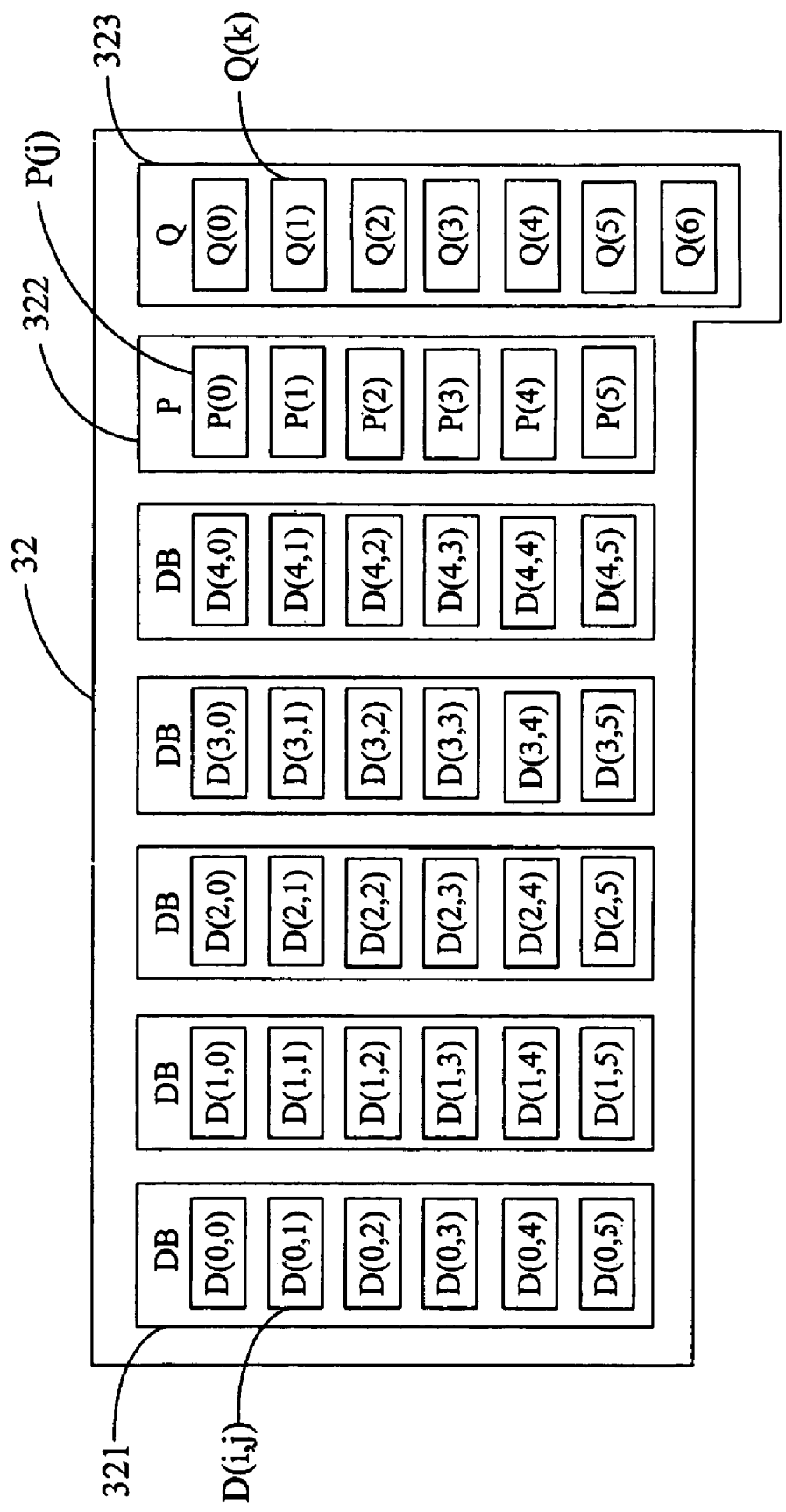
FIG. 3 is a schematic diagram showing data blocks of data segments and P/Q parity blocks of P/Q parity segments contained in a data set in a disk array.

FIG. 3 is a schematic diagram showing data blocks of data segments 321 and P/Q parity blocks of P/Q parity segments 322/323 contained in a data set 32 in the disk array 3. In the preferred embodiment, the disk array 3 distributes data to multiple disks 30, and employs data sets 32 (only one labeled) to represent a group of related blocks. The disk array 3 contains seven disks 30 symbolically depicted as disk 0, disk 1, . . . , and disk 6, each of which is divided into multiple blocks having the same size. Disks 0, 1, 2, 3, and 4 are for storing the data segments 321, and disks 5 and 6 are for storing the P parity segments 322 and the Q parity segments 323 respectively. Each data segment 321 and the P parity segment 322 respectively contain (p−1) blocks, and the Q parity segment 323 contains p blocks. Therefore, the Q parity segment 323 contains one more block than the P parity segment 322. Wherein p is any prime number (hereinafter p is a predetermine prime number), such as the number 2, 3, 5, 7, 9 etc. For convenience, in the preferred embodiment, p is 7. Nevertheless, the description should not be construed as limiting the invention to any p being particular number. Thus, in the preferred embodiment, each data segment 321 is divided into six data blocks depicted as data D(i,j)s, and the P parity segment 322 is divided into six P parity blocks depicted as parity P(j)s, and the Q parity segment 323 is divided into seven Q parity blocks depicted as parity Q(k)s. In this nomenclature, i represents a number of a corresponding disk 30, and j and k respectively represent a block number.

Wherein P(j), the value of a P parity block in the data set 32, is computed by an XOR operation of all of the data D(i,j)s, each of which has the same block number j as P(j). Likewise, Q(k), the value of a Q parity block in the data set 32, is computed by an XOR operation of all of the data D(i,j)s, wherein k, i and j are related as follows: k=((i+j) mod p).

According to the calculation rules described above, the following formulas are obtained. Each formula describes how to calculate a parity P(j)/Q(k) by using corresponding data D(i,j)s:

$$P(0)=D(0,0) \oplus D(1,0) \oplus D(2,0) \oplus D(3,0) \oplus D(4,0);$$

$$P(1)=D(0,1) \oplus D(1,1) \oplus D(2,1) \oplus D(3,1) \oplus D(4,1);$$

$$P(2)=D(0,2) \oplus D(1,2) \oplus D(2,2) \oplus D(3,2) \oplus D(4,2);$$

$$P(3)=D(0,3) \oplus D(1,3) \oplus D(2,3) \oplus D(3,3) \oplus D(4,3);$$

$$P(4)=D(0,4) \oplus D(1,4) \oplus D(2,4) \oplus D(3,4) \oplus D(4,4);$$

$$P(5)=D(0,5) \oplus D(1,5) \oplus D(2,5) \oplus D(3,5) \oplus D(4,5); \text{ and}$$

$$Q(0)=D(0,0) \oplus D(4,3) \oplus D(3,4) \oplus D(2,5);$$

$$Q(1)=D(1,0) \oplus D(0,1) \oplus D(4,4) \oplus D(3,5);$$

$$Q(2)=D(2,0) \oplus D(1,1) \oplus D(0,2) \oplus D(4,5);$$

$$Q(3)=D(3,0) \oplus D(2,1) \oplus D(1,2) \oplus D(0,3);$$

$$Q(4)=D(4,0) \oplus D(3,1) \oplus D(2,2) \oplus D(1,3) \oplus D(0,4);$$

$$Q(5)=D(4,1) \oplus D(3,2) \oplus D(2,3) \oplus D(4,1) \oplus D(0,5);$$

$$Q(6)=D(4,2) \oplus D(3,3) \oplus D(2,4) \oplus D(1,5).$$

Figure 4:
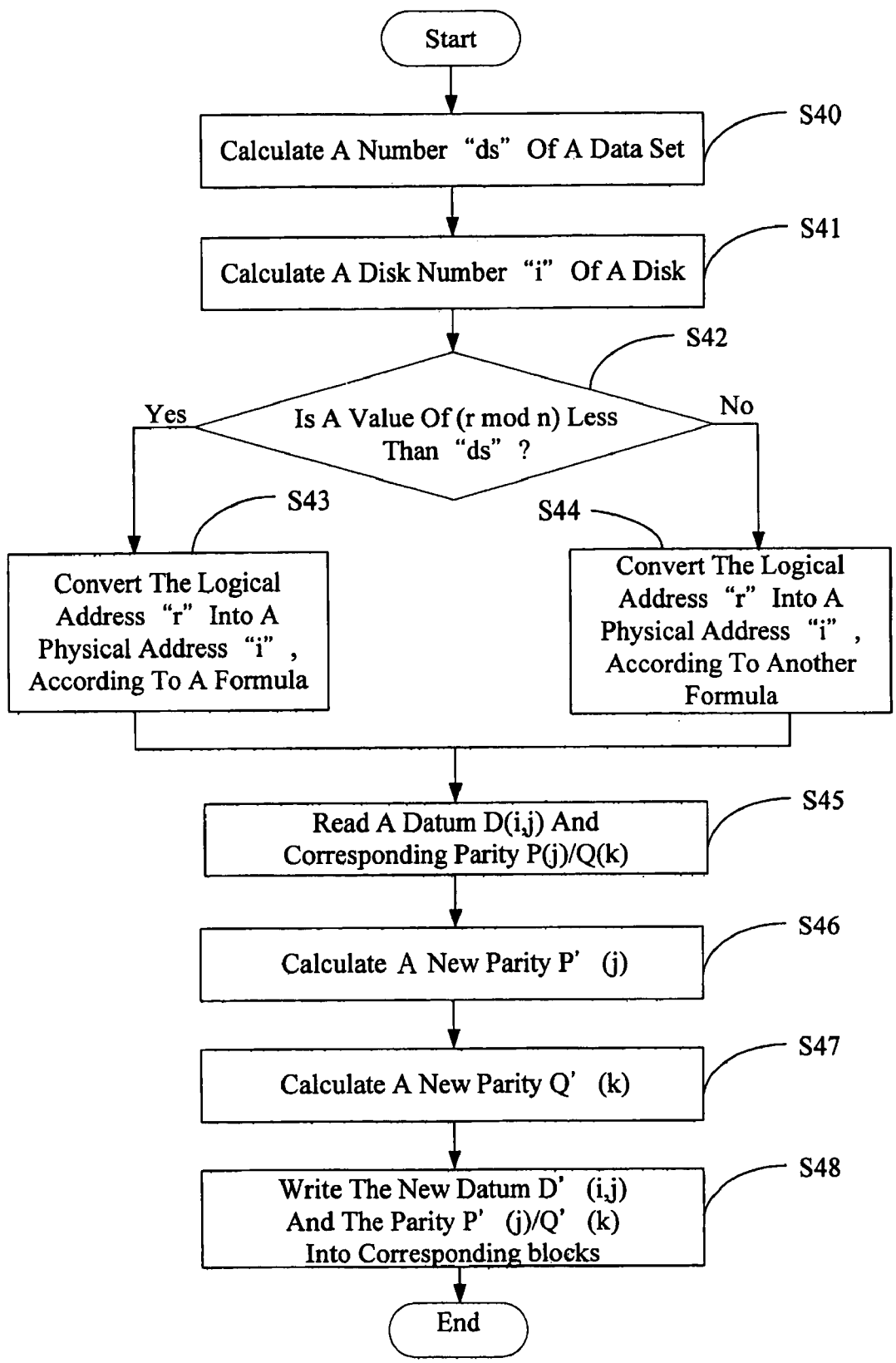
FIG. 4 is a flowchart of a preferred method for reading/writing a datum after converting a logical address into a physical address, in accordance with a preferred embodiment of the present invention.

FIG. 4 is a flowchart of a preferred method for reading/writing a datum D(i,j) after converting a logical address into a physical address, which is performed by utilizing the system. In step S40, the modulus operation unit 11 calculates a number "ds" of a data set 32 according to the formula: ds=(r/(n*(p−1))) mod (n+2), wherein r is a logical address of a data block, and n is a number of disks 30 for storing data blocks. In step S41, the modulus operation unit 11 calculates a number "i" of a disk 30 according to another formula: i=((r mod n)+(n+2−ds)) mod (n+2). In step S42, the modulus operation unit 11 determines whether a value of (r mod n) is less than ds. If the value of (r mod n) is less than ds, in step S43, the address conversion unit 13 converts the logical address r into a physical address "j" of the data block, according to the formula: j=r/n+r/n*p*(p−1)+1. Thereupon the procedure goes to step S45 described below. In contrast, if the value of (r mod n) is not less than ds, in step S44, the address conversion unit 13 converts the logical address r into a physical address "j" of the data block, according to another formula: j=r/n+r/n*p*(p−1). Thereupon the procedure goes to step S45. In step S45, the CPU 1 reads a datum D(i,j) from the data block, and corresponding parity P(j)/Q(k) from the parity block of the disks 30. In step S46, the XOR unit 2 calculates an XOR of the datum D(i,j), a new datum D'(i,j) and the parity P(j) to obtain a new parity P'(j). In step S47, the XOR unit 2 calculates an XOR of the datum D(i,j), the new datum D'(i,j) and the parity Q(k) to obtain a new parity Q'(k). In step S48, the CPU 1 writes the new datum D'(i,j) into the data block, and writes the new parity P'(j)/Q'(k) into the P/Q parity block of a corresponding disk 30.

Figure 5:
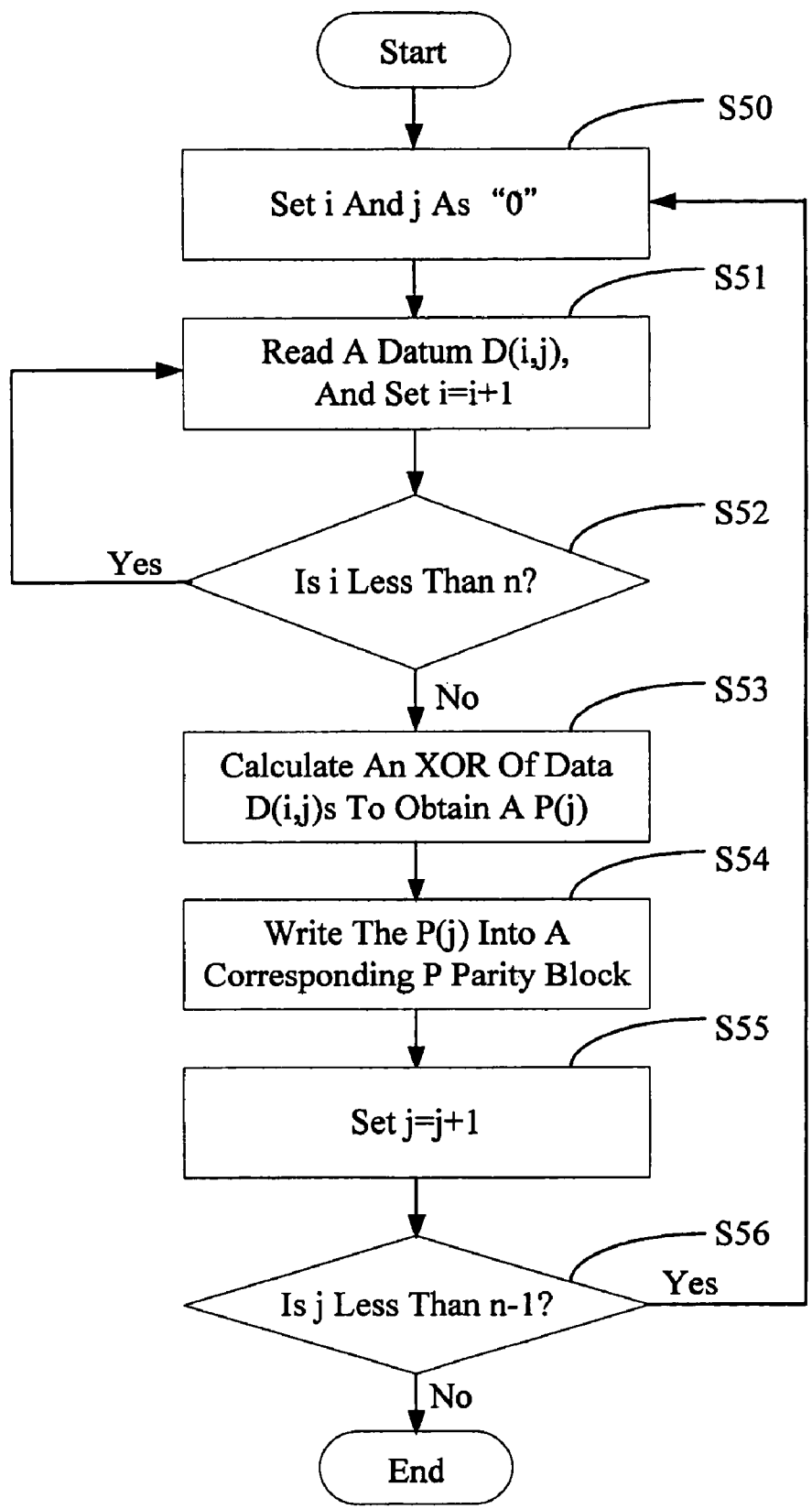
FIG. 5 is a flowchart of a preferred method for calculating parities P(j)s.

FIG. 5 is a flowchart of a preferred method for calculating parities P(j)s, which is performed by utilizing the system. In step S50, the CPU 1 respectively sets i and j as "0." In step S51, the CPU 1 reads a datum D(i,j) from the disk array 3 utilizing the method of FIG. 4, and sets i=i+1. In step S52, the CPU 1 determines whether i is less than n. If i is less than n, the procedure returns to step S51 described above. In contrast, if i is not less than n, in step S53, the CPU 1 calculates an XOR of all the data D(i,j)s which have the same block number j to obtain a corresponding P(j). In step S64, the CPU 1 writes the P(j) into a corresponding P parity block. In step S55, the CPU 1 sets j=j+1 to calculate another P(j). In step S56, the CPU 1 determines whether j is less than n−1. If j is less than n−1, the procedure returns to step S51. In contrast, if j is not less than n−1, the procedure is finished.

Figure 6:
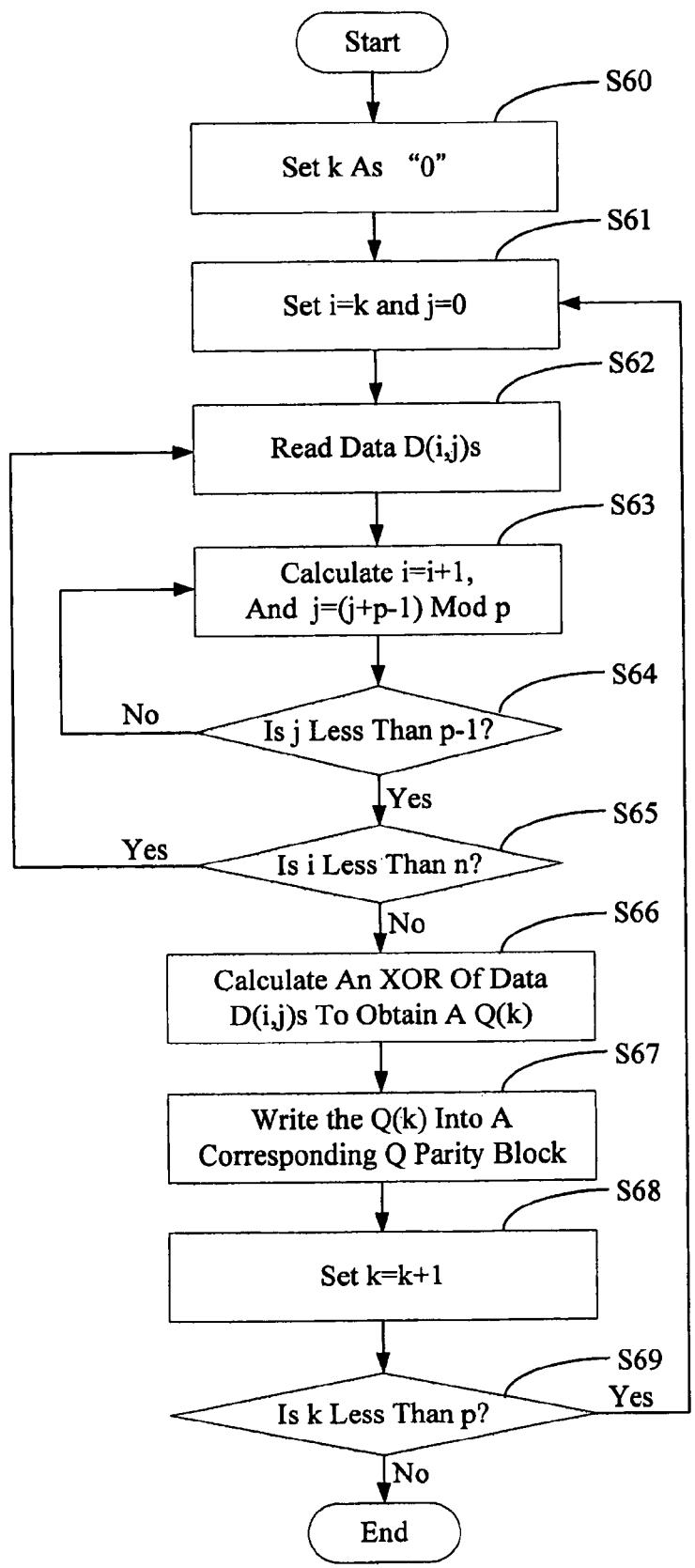
FIG. 6 is a flowchart of a preferred method for calculating parities Q(k)s.

FIG. 6 is a flowchart of a preferred method for calculating parities Q(k)s, which is performed by utilizing the system. In step S60, the CPU 1 sets k as "0." In step S61, the CPU 1 sets i=k and j=0. In step S62, the CPU 1 reads a datum D(i,j) whose i and j meet the relationship: k=((i+j) mod p), wherein p is any prime number, by utilizing the method of FIG. 4. In step S63, the CPU 1 calculates i=i+1 and j=((j+p−1) mod p) to read another datum D(i,j). In step S64, the CPU 1 determines whether j is less than p−1. If j is not less than p−1, the procedure returns to step S63. In contrast, if j is less than n−1, in step S65, the CPU 1 determines whether i is less than n. If i is less than n, the procedure returns to step S62. In contrast, if i not less than n, in step S66, the CPU 1 calculates an XOR of all the data D(i,j)s to obtain a corresponding Q(k). In step S67, the CPU 1 writes the Q(k) into a corresponding Q parity block. In step S68, the CPU 1 sets k=k+1 to calculate another Q(k). In step S69, the CPU 1 determines whether k is less than p. If k is less than p, the procedure returns to step S61. In contrast, if k is not less than p, the procedure is finished.

Figure 7:
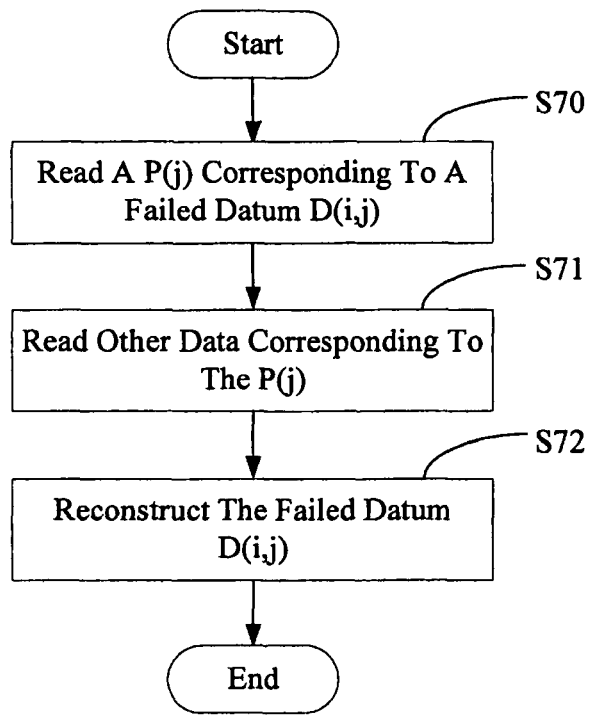
FIG. 7 is a flowchart of a preferred method for reconstructing a failed datum utilizing a P parity.

FIG. 7 is a flowchart of a preferred method for reconstructing a failed datum D(i,j) using a parity P(j), which is performed by utilizing the system. In step S70, the CPU 1 reads a P(j) which corresponds to the failed datum D(i,j). That is, the P(j) has the same block number j as the failed datum D(i,j). In step S71, the CPU 1 reads other data which corresponds to the P(j) (that is, other data have the same block number j as the P(j)), by utilizing the method of FIG. 4. In step S72, the CPU 1 reconstructs the failed datum D(i,j). That is, the CPU 1 calculates the failed datum D(i,j) by an XOR of the P(j) and other corresponding data.

Figure 8:
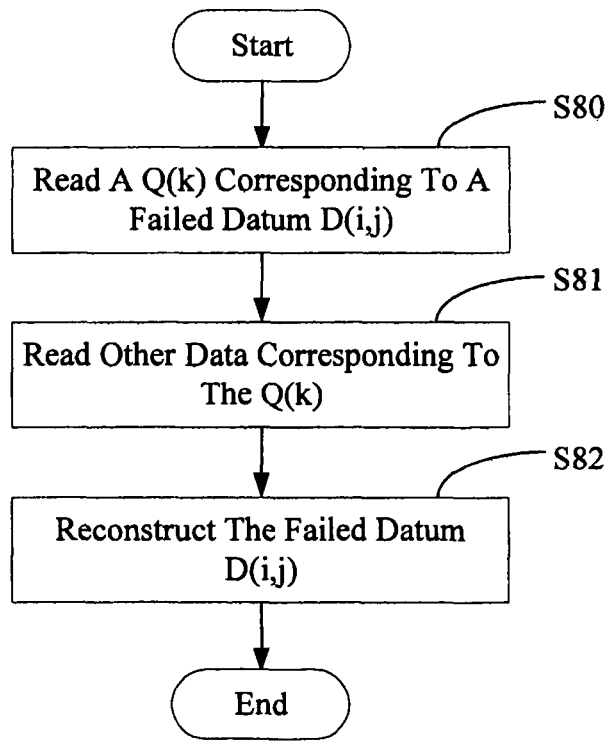
FIG. 8 is a flowchart of a preferred method for reconstructing a failed datum utilizing a Q parity.

FIG. 8 is a flowchart of a preferred method for reconstructing a failed datum D(i,j) using a parity Q(k), which is performed by utilizing the system. In step S80, the CPU 1 reads a Q(k) which corresponds to the failed datum D(i,j); that is, where k, i and j meet the relationship: k=((i+j) mod p). In step S81, the CPU 1 reads other data corresponding to the Q(k), by utilizing the method of FIG. 4. In step S82, the CPU 1 reconstructs the failed datum D(i,j). That is, the CPU 1 calculates the failed datum D(i,j) by an XOR of the Q(k) and other corresponding data.

Figure 9:
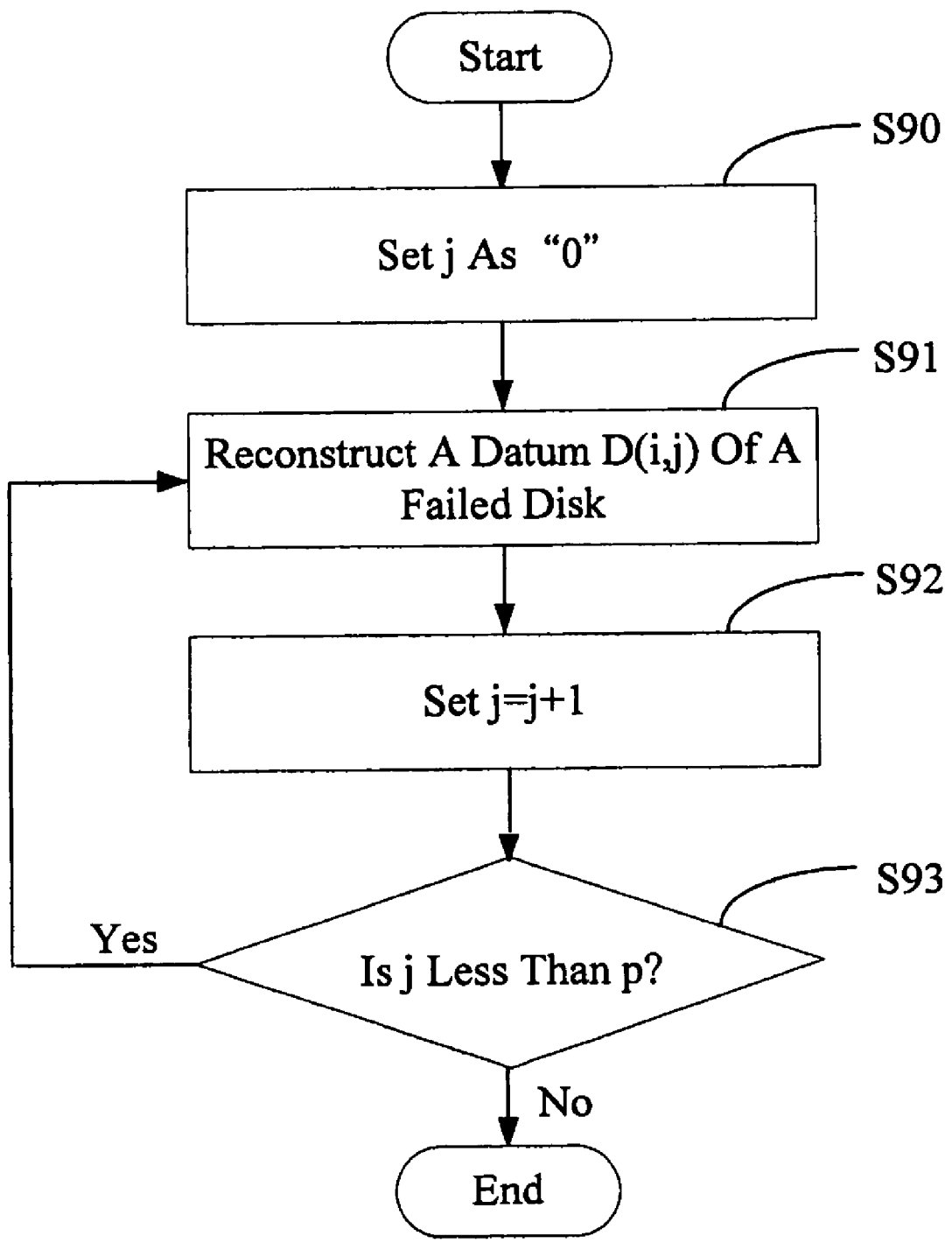
FIG. 9 is a flowchart of a preferred method for reconstructing a single failed disk.

FIG. 9 is a flowchart of a preferred method for reconstructing a single failed disk 30, which is performed by utilizing the system. Generally, when a single disk fails, the data lost on that single disk is reconstructed by performing an XOR of the relevant data and corresponding parity P or parity Q on an additional new disk. In step S90, the CPU 1 sets j as "0." In step S91, the CPU 1 reconstructs a datum D(i,j) of the single failed disk 30 by utilizing either of the methods of FIGS. 7 and 8. In step S92, the CPU 1 sets j=j+1 to reconstruct another datum D(i,j). In step S93, the CPU 1 determines whether j is less than p, wherein p is a predetermine prime number. If j is less than p, the procedure returns to step S91. In contrast, if j is not less than p, the procedure is finished, because all data D(i,j)s of the single failed disk 30 have been reconstructed.

Figure 10:
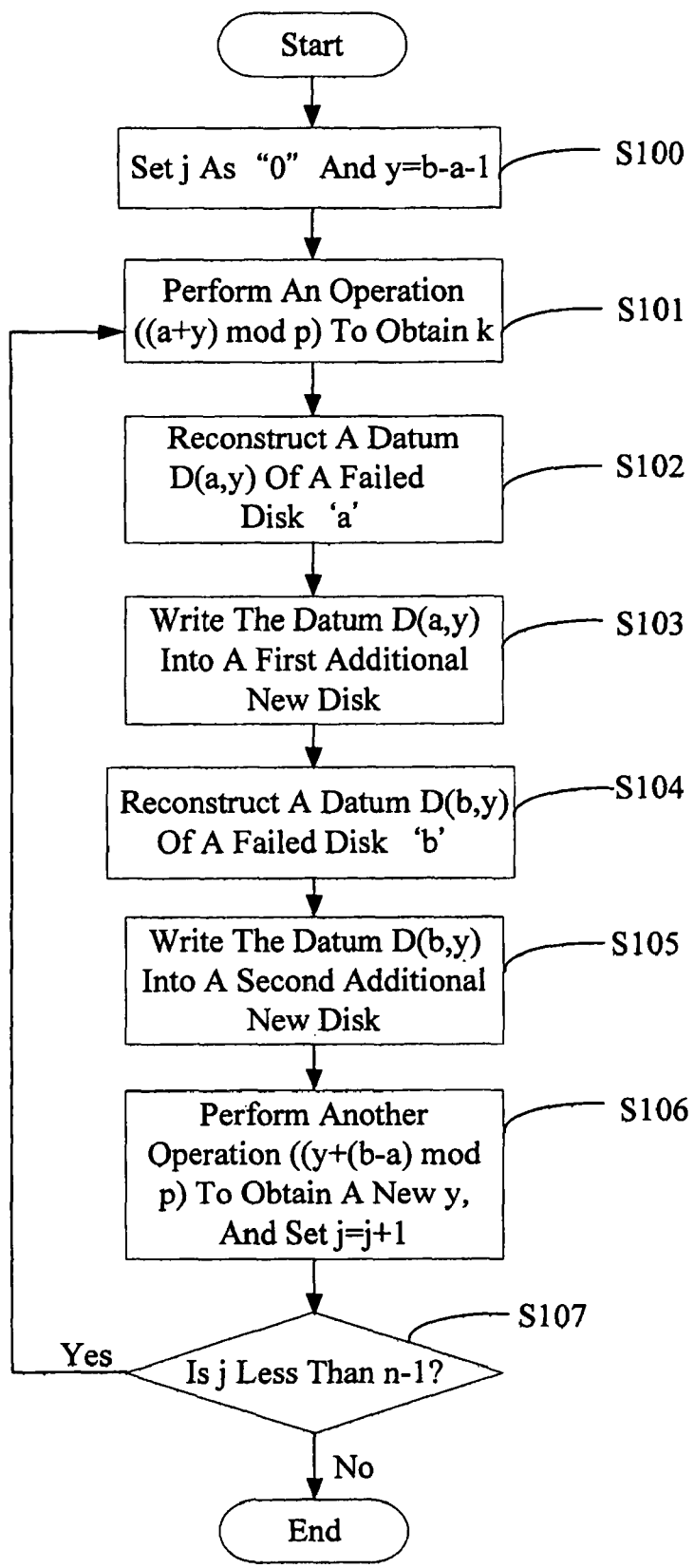
FIG. 10 is a flowchart of a preferred method for reconstructing two failed disks.

FIG. 10 is a flowchart of a preferred method for reconstructing two failed disks 30, which is performed by utilizing the system. In step S100, the CPU 1 sets j as "0" and y=b−a−1. In this formula, 'a' and 'b' respectively represent the disk numbers of the two failed disks 30, with 'a' being less than 'b.' Further, 'y' is a parameter designated to represent a block number of a data block or a P parity block. In step S101, the CPU 1 performs the operation ((a+y) mod p) to obtain 'k.' The obtained 'k' is also a parameter, designated to represent a block number of a Q parity block. In step S102, the CPU 1 reconstructs a datum D(a,y) of the failed disk 'a' by utilizing the method of FIG. 8 and a corresponding Q(k). In step S103, the CPU 1 writes the reconstructed datum D(a,y) into a first additional new disk, in order to replace the failed disk 'a.' In step S104, the CPU 1 reconstructs a datum D(b,y) of the failed disk 'b' by utilizing the method of FIG. 7 and a corresponding P(y). In step S105, the CPU 1 writes the reconstructed datum D(b,y) into a second additional new disk, in order to replace the failed disk 'b.' In step S106, the CPU performs another operation ((y+(b−a)) mod p) to obtain a new 'y,' and sets j=j+1 to reconstruct another datum of the two failed disks 30. In step S107, the CPU 1 determines whether j is less than n−1. If j is less than n−1, the procedure returns to step S101. In contrast, if j is not less than n−1, the procedure is finished, because all data of the two failed disks 30 have been reconstructed.

According to the above-described reconstruction procedures, an example of reconstructing two failed disks 30 by utilizing the system and the method of FIG. 10 is shown and described below. Table 1 represents a system of 7 disks, with each disk represented by a column of the table. Disk 0 through disk 4 each contains six data blocks, disk 5 contains six P parity blocks, and disk 6 contains seven Q parity blocks.

TABLE 1

| Disk0 | Disk1 | Disk2 | Disk3 | Disk4 | Disk5 | Disk6 |
|---|---|---|---|---|---|---|
| D(0,0) | D(1,0) | D(2,0) | D(3,0) | D(4,0) | P(0) | Q(0) |
| D(0,1) | D(1,1) | D(2,1) | D(3,1) | D(4,1) | P(1) | Q(1) |
| D(0,2) | D(1,2) | D(2,2) | D(3,2) | D(4,2) | P(2) | Q(2) |
| D(0,3) | D(1,3) | D(2,3) | D(3,3) | D(4,3) | P(3) | Q(3) |
| D(0,4) | D(1,4) | D(2,4) | D(3,4) | D(4,4) | P(4) | Q(4) |
| D(0,5) | D(1,5) | D(2,5) | D(3,5) | D(4,5) | P(5) | Q(5) |
|  |  |  |  |  |  | Q(6) |

Wherein:

$P(0)=D(0,0) \oplus D(1,0) \oplus D(2,0) \oplus D(3,0) \oplus D(4,0);$ $P(1)=D(0,1) \oplus D(1,1) \oplus D(2,1) \oplus D(3,1) \oplus D(4,1);$ $P(2)=D(0,2) \oplus D(1,2) \oplus D(2,2) \oplus D(3,2) \oplus D(4,2);$ $P(3)=D(0,3) \oplus D(1,3) \oplus D(2,3) \oplus D(3,3) \oplus D(4,3);$ $P(4)=D(0,4) \oplus D(1,4) \oplus D(2,4) \oplus D(3,4) \oplus D(4,4);$ $P(5)=D(0,5) \oplus D(1,5) \oplus D(2,5) \oplus D(3,5) \oplus D(4,5);$ $Q(0)=D(0,0) \oplus D(4,3) \oplus D(3,4) \oplus D(2,5);$ $Q(1)=D(1,0) \oplus D(0,1) \oplus D(4,4) \oplus D(3,5);$ $Q(2)=D(2,0) \oplus D(1,1) \oplus D(0,2) \oplus D(4,5);$ $Q(3)=D(3,0) \oplus D(2,1) \oplus D(1,2) \oplus D(0,3);$ $Q(4)=D(4,0) \oplus D(3,1) \oplus D(2,2) \oplus D(1,3) \oplus D(0,4);$ $Q(5)=D(4,1) \oplus D(3,2) \oplus D(2,3) \oplus D(4,1) \oplus D(0,5);$ and $Q(6)=D(4,2) \oplus D(3,3) \oplus D(2,4) \oplus D(1,5).$ In table 2, it is assumed that disk 0 and disk 3 fail, so that disk 0 and disk 3 are each missing all their data (hereinafter "x" represents the missing data). Disk 0 and disk 3 cannot be reconstructed utilizing the method of FIG. 7 immediately, due to each P(j) missing two corresponding data.

TABLE 2

| Disk0 | Disk1 | Disk2 | Disk3 | Disk4 | Disk5 | Disk6 |
|---|---|---|---|---|---|---|
| x | D(1,0) | D(2,0) | x | D(4,0) | P(0) | Q(0) |
| x | D(1,1) | D(2,1) | x | D(4,1) | P(1) | Q(1) |
| x | D(1,2) | D(2,2) | x | D(4,2) | P(2) | Q(2) |
| x | D(1,3) | D(2,3) | x | D(4,3) | P(3) | Q(3) |
| x | D(1,4) | D(2,4) | x | D(4,4) | P(4) | Q(4) |
| x | D(1,5) | D(2,5) | x | D(4,5) | P(5) | Q(5) |
|  |  |  |  |  |  | Q(6) |

However, it can be seen that Q(2) misses only one datum D(0,2). According to the formula: $D(0,2)=Q(2) \oplus D(1,1) \oplus D(2,0) \oplus D(4,5)$, the missing datum D(0,2) can be reconstructed by utilizing the method of FIG. 8. Simultaneously, it can also be seen that Q(6) misses only one datum D(3,3). According to the formula: $D(3,3)=Q(6) \oplus D(4,2) \oplus D(2,4) \oplus D(1,5)$, the missing datum D(3,3) can also be reconstructed by utilizing the method of FIG. 8. Upon completion of these reconstructions, the disks are in a state as shown in Table 3.

TABLE 3

| Disk0 | Disk1 | Disk2 | Disk3 | Disk4 | Disk5 | Disk6 |
|---|---|---|---|---|---|---|
| x | D(1,0) | D(2,0) | x | D(4,0) | P(0) | Q(0) |
| x | D(1,1) | D(2,1) | x | D(4,1) | P(1) | Q(1) |
| D(0,2) | D(1,2) | D(2,2) | x | D(4,2) | P(2) | Q(2) |
| x | D(1,3) | D(2,3) | D(3,3) | D(4,3) | P(3) | Q(3) |
| x | D(1,4) | D(2,4) | x | D(4,4) | P(4) | Q(4) |
| x | D(1,5) | D(2,5) | x | D(4,5) | P(5) | Q(5) |
|  |  |  |  |  |  | Q(6) |

Now, according to the formula: $D(3,2)=P(2) \oplus D(0,2) \oplus D(1,2) \oplus D(2,2) \oplus D(4,2)$, there is enough information to reconstruct the missing datum D(3,2) by utilizing the method of FIG. 7. Simultaneously, according to the formula: $D(0,3)=P(3) \oplus D(1,3) \oplus D(2,3) \oplus D(3,3) \oplus D(4,3)$, the missing datum D(0,3) can also be reconstructed by utilizing the method of FIG. 7. Upon completion of these reconstructions, the disks are in a state as shown in Table 4.

TABLE 4

| Disk0 | Disk1 | Disk2 | Disk3 | Disk4 | Disk5 | Disk6 |
|---|---|---|---|---|---|---|
| x | D(1,0) | D(2,0) | x | D(4,0) | P(0) | Q(0) |
| x | D(1,1) | D(2,1) | x | D(4,1) | P(1) | Q(1) |
| D(0,2) | D(1,2) | D(2,2) | D(3,2) | D(4,2) | P(2) | Q(2) |
| D(0,3) | D(1,3) | D(2,3) | D(3,3) | D(4,3) | P(3) | Q(3) |
| x | D(1,4) | D(2,4) | x | D(4,4) | P(4) | Q(4) |
| x | D(1,5) | D(2,5) | x | D(4,5) | P(5) | Q(5) |
|  |  |  |  |  |  | Q(6) |

It can be seen that Q(3) misses only one datum D(3,0). According to the formula: $D(3,0)=Q(3) \oplus D(2,1) \oplus D(1,2) \oplus D$ (0,3), the missing datum D(3,0) can be reconstructed by utilizing the method of FIG. 8. Simultaneously, it can also be seen that Q(5) misses only one datum D(0,5). According to the formula: D(0,5)=Q(5)⊕D(4,1)⊕D(3,2)⊕D(2,3)⊕D(4,1), the missing datum D(0,5) can also be reconstructed by utilizing the method of FIG. 8. Upon completion of these reconstructions, the disks are in a state as shown in Table 5.

TABLE 5

| Disk0 | Disk1 | Disk2 | Disk3 | Disk4 | Disk5 | Disk6 |
|---|---|---|---|---|---|---|
| x | D(1,0) | D(2,0) | D(3,0) | D(4,0) | P(0) | Q(0) |
| x | D(1,1) | D(2,1) | x | D(4,1) | P(1) | Q(1) |
| D(0,2) | D(1,2) | D(2,2) | D(3,2) | D(4,2) | P(2) | Q(2) |
| D(0,3) | D(1,3) | D(2,3) | D(3,3) | D(4,3) | P(3) | Q(3) |
| x | D(1,4) | D(2,4) | x | D(4,4) | P(4) | Q(4) |
| D(0,5) | D(1,5) | D(2,5) | x | D(4,5) | P(5) | Q(5) |
| | | | | | | Q(6) |

According to the formula: D(0,0)=P(0)⊕D(1,0)⊕D(2,0)⊕D(3,0)⊕D(4,0), there is enough information to reconstruct the missing datum D(0,0) by utilizing the method of FIG. 7. Simultaneously, according to the formula: D(3,5)=P(5)⊕D(1,5)⊕D(2,5)⊕D(3,5)⊕D(4,5), the missing datum D(3,5) can also be reconstructed by utilizing the method of FIG. 7. Upon completion of these reconstructions, the disks are in a state as shown in Table 6.

TABLE 6

| Disk0 | Disk1 | Disk2 | Disk3 | Disk4 | Disk5 | Disk6 |
|---|---|---|---|---|---|---|
| D(0,0) | D(1,0) | D(2,0) | D(3,0) | D(4,0) | P(0) | Q(0) |
| x | D(1,1) | D(2,1) | x | D(4,1) | P(1) | Q(1) |
| D(0,2) | D(1,2) | D(2,2) | D(3,2) | D(4,2) | P(2) | Q(2) |
| D(0,3) | D(1,3) | D(2,3) | D(3,3) | D(4,3) | P(3) | Q(3) |
| x | D(1,4) | D(2,4) | x | D(4,4) | P(4) | Q(4) |
| D(0,5) | D(1,5) | D(2,5) | D(3,5) | D(4,5) | P(5) | Q(5) |
| | | | | | | Q(6) |

It can be seen that Q(0) misses only one datum D(3,4). According to the formula: D(3,4)=Q(0)⊕D(0,0)⊕D(4,3)⊕D(2,5), the missing datum D(3,4) can be reconstructed by utilizing the method of FIG. 8. Simultaneously, it can also be seen that Q(1) misses only one datum D(0,1). According to the formula: D(0,1)=Q(1)⊕D(1,0)⊕D(1,0)⊕D(3,5)⊕D(4,4), the missing datum D(0,1) can also be reconstructed by utilizing the method of FIG. 8. Upon completion of these reconstructions, the disks are in a state as shown in Table 7.

TABLE 7

| Disk0 | Disk1 | Disk2 | Disk3 | Disk4 | Disk5 | Disk6 |
|---|---|---|---|---|---|---|
| D(0,0) | D(1,0) | D(2,0) | D(3,0) | D(4,0) | P(0) | Q(0) |
| D(0,1) | D(1,1) | D(2,1) | x | D(4,1) | P(1) | Q(1) |
| D(0,2) | D(1,2) | D(2,2) | D(3,2) | D(4,2) | P(2) | Q(2) |
| D(0,3) | D(1,3) | D(2,3) | D(3,3) | D(4,3) | P(3) | Q(3) |
| x | D(1,4) | D(2,4) | D(3,4) | D(4,4) | P(4) | Q(4) |
| D(0,5) | D(1,5) | D(2,5) | D(3,5) | D(4,5) | P(5) | Q(5) |
| | | | | | | Q(6) |

Finally, according to the formula: D(3,1)=P(1)⊕D(0,1)⊕D(1,1)⊕D(2,1)⊕D(4,1), there is enough information to reconstruct the missing datum D(3,1) by utilizing the method of FIG. 7. Simultaneously, according to the formula: D(0,4)=P(4)⊕D(1,4)⊕D(2,4)⊕D(3,4)⊕D(4,4), the missing datum D(0,4) can also be reconstructed by utilizing the method of FIG. 7. Upon completion of these reconstructions, the disks are in a state as shown in Table 8. That is, all the data of the two failed disks 0 and 3 have been reconstructed.

TABLE 8

| Disk0 | Disk1 | Disk2 | Disk3 | Disk4 | Disk5 | Disk6 |
|---|---|---|---|---|---|---|
| D(0,0) | D(1,0) | D(2,0) | D(3,0) | D(4,0) | P(0) | Q(0) |
| D(0,1) | D(1,1) | D(2,1) | D(3,1) | D(4,1) | P(1) | Q(1) |
| D(0,2) | D(1,2) | D(2,2) | D(3,2) | D(4,2) | P(2) | Q(2) |
| D(0,3) | D(1,3) | D(2,3) | D(3,3) | D(4,3) | P(3) | Q(3) |
| D(0,4) | D(1,4) | D(2,4) | D(3,4) | D(4,4) | P(4) | Q(4) |
| D(0,5) | D(1,5) | D(2,5) | D(3,5) | D(4,5) | P(5) | Q(5) |
| | | | | | | Q(6) |

Although the present invention has been specifically described on the basis of a preferred embodiment and preferred method, the invention is not to be construed as being limited thereto. Various changes or modifications may be made to the embodiment and method without departing from the scope and spirit of the invention.

We claim:

1. A fault tolerance system for multiple failed disks in a disk array, comprising:
    a disk array, the disk array comprising a plurality of disks, each of which is logically divided into multiple storage blocks, the storage blocks comprising:
    a plurality of data blocks, the data blocks being stored in n disks, each of which can be symbolically depicted as D(i,j), wherein i is a disk number of each disk, and j is a data block number of the disk;
    parity blocks, which can be symbolically depicted as P parity blocks, the P parity blocks being stored in an independent disk, and being for storing P parities, which can be symbolically depicted as P(j); and
    parity blocks, which can be symbolically depicted as Q parity blocks, the Q parity blocks being stored in another independent disk, and being for storing Q parities, which can be symbolically depicted as Q(k), wherein k is a Q parity block number;
    a processor, which is connected to the disk array through a bus, and which is for performing modulus operations, shift operations, and address conversion operations; and
    an exclusive-or (XOR) unit for performing XOR operations on the storage blocks of the disk array when generating a P parity block or a Q parity block, or reconstructing failed data; and
    wherein the processor is further operable to restore the data blocks of two or more failed disks in the disk array by means of:
        (i) setting a parameter y=b−a−1, wherein 'b' and 'a' respectively represent disk numbers of said two failed disks, and 'a' is less than 'b;'
        (ii) performing a first operation to obtain k=((a+y) mod p), wherein p is a prime number;
        (iii) reconstructing a data block D(a,y) of said failed disk 'a' using a parity Q(k);
        (iv) reconstructing a data block D(b,y) of said failed disk 'b' using a parity P(y);
        (v) performing a second operation to obtain y=((y+(b−a)) mod p); and
        (vi) repeating step (ii) to step (v) until all data blocks of said two failed disks are reconstructed.

2. The system according to claim 1, wherein n is any number greater than 4.

3. The system according to claim 1, wherein P(j) is computed as an XOR of all of the data D(i,j)s, each of which has the same block number j.

4. The system according to claim 1, wherein Q(k) is computed as an XOR of all of the data D(i,j)s, and k meets the relationship: k=(i+j) mod p, wherein p is a prime number.

5. A fault tolerance method for multiple failed disks in a disk array, comprising:

assigning a plurality of data blocks D(i,j)s from operable data into n selective disks of the disk array, wherein i is a disk number of each disk, and j is a data block number of the disk;

computing parities P(j)s of P parity blocks according to the corresponding data blocks in the disk array;

assigning the P parity blocks into an independent disk;

computing parities Q(k)s of Q parity blocks according to the corresponding data blocks in the disk array, wherein k is a Q parity block number;

assigning the Q parity blocks into another independent disk; and restoring data blocks of two or more failed disks in the disk array by means of utilizing the parities P(j)s or the parities Q(k)s, wherein the restoring step comprises:

(i) setting a block number i as "0" and a parameter y=b−a−1, wherein 'b' and 'a' respectively represent disk numbers of the two failed disks, and 'a' is less than 'b;'

(ii) performing a first operation to obtain k=((a+y) mod p), wherein p is a prime number;

(iii) reconstructing a data block D(a,y) of the failed disk 'a' utilizing a parity Q(k);

(iv) reconstructing a data block D(b,y) of the failed disk 'b' utilizing a parity P(y);

(v) performing a second operation to obtain y=((y+(b−a)) mod p), and setting j=i+1;

(vi) determining whether i is less than n−1; and (vii) repeating from step (ii) to step (v) to reconstruct other data blocks of the two failed disks if i is less than n−1.

6. The method according to claim 5, wherein n is any number greater than 4.

7. The method according to claim 5, wherein the step of computing parities P(j)s of P parity blocks according to the corresponding data blocks in the disk array comprises the steps of:

(a1) setting i and j as "0," wherein i and j respectively represent a disk number of a disk and a block number of a data block;

(a2) reading a datum D(i,j) from the disk array and setting i=j+1;

(a3) determining whether i is less than n, wherein n is a number of disks for storing data D(i,j)s and is any number greater than 4;

(a4) returning to the step (a2), if i is less than n;

(a5) calculating an XOR of all data D(i,j)s which have the same block number j to obtain a corresponding parity P(j), if i is not less than n;

(a6) writing P(j) into a corresponding P parity block;

(a7) setting j=j+1 to calculate another P(j);

(a8) determining whether j is less than n−1; and (a9) returning to the step a(2), if j is less than n−1.

8. The method according to claim 7, wherein reading a datum D(i,j) from the disk array comprises the steps of:

calculating a data set number "ds" according to the formula: ds=(r/(n*(p−1))) mod (n+2), wherein r is a logical address of a data block;

calculating a disk number "i" according to another formula: i=((r mod n)+(n+2−ds)) mod (n+2);

determining whether a value of (r mod n) is less than ds; and converting the logical address r into a corresponding physical address "j" of the data block, according to the formula: j=r/n+r/n*p*(p−2)+1, if (r mod n) is less than ds; or converting the logical address r into a corresponding physical address "j" of the data block, according to another formula: j=r/n+r/n*p*(p−1).

9. The method according to claim 5, wherein the step of computing parities Q(k)s of Q parity blocks according to the corresponding data blocks in the disk array comprises the steps of:

(b1) setting k as "0," wherein k is a parameter designated to represent a block number of a Q parity block;

(b2) setting i=k and j=0, wherein i and j respectively represent a disk number of a disk and a block number of a data block;

(b3) reading a datum D(i,j) whose i and j meet the relationship: k=(i+j) mod p, wherein p is any prime number;

(b4) setting i=i+1 and j=(j+p−1) mod p to read another datum D(i,j);

(b5) determining whether j is less than p−1;

(b6) returning to the step (b4), if j is not less than p−1;

(b7) determining whether i is less than n, if j is less than p−1;

(b8) returning to the step (b3), if i is less than n;

(b9) calculating an XOR of all the data D(i,j)s to obtain a corresponding parity Q(k), if i is not less than n;

(b10) writing Q(k) into a corresponding Q parity block;

(b11) setting k=k+1 to calculate another Q(k);

(b12) determining whether k is less than p; and (b13) returning to the step (b2), if k is less than p.

10. The method according to claim 5, further comprising a step of restoring data blocks of one failed disk in the disk array by means of utilizing the parities P(j)s or the parities Q(k)s, comprising the steps of:

setting a block number j as "0;"

reconstructing a datum D(i,j) of the failed disk utilizing a parity P(j), wherein i is a disk number of the failed disk; or reconstructing a datum D(i,j) of the failed disk utilizing a parity Q(k), wherein k is a parameter designated to represent a block number of a Q parity block;

setting j=j+1 to reconstruct another datum D(i,j);

determining whether j is less than p, wherein p is a predetermined prime number; and returning to the step of reconstructing a datum D(i,j) of the failed disk utilizing a parity P(j) or to the step of reconstructing a datum D(i,j) of the failed disk utilizing a parity Q(k), if j is less than n−1.

11. The method according to claim 10, wherein the step of reconstructing a datum D(i,j) of the failed disk utilizing a parity P(j) comprises the steps of:

reading the P(j) which corresponds to the failed datum D(i,j);

reading other data corresponding to the P(j); and calculating the failed datum D(i,j) by an XOR of the P(j) and other corresponding data.

12. The method according to claim 10, wherein the step of reconstructing a datum D(i,j) of the failed disk utilizing a parity Q(k) comprises the steps of:

reading the Q(k) which corresponds to the failed datum D(i,j);

reading other data corresponding to the Q(k); and calculating the failed datum D(i,j) by an XOR of the Q(k) and other corresponding data.

13. The method according to claim 5, wherein the step (iii) comprises the steps of:

reading the Q(k) which corresponds to the failed datum D(a,y);

reading other data corresponding to the Q(k); and calculating the failed datum D(a,y) by an XOR of the Q(k) and other corresponding data.

14. The method according to claim 5, wherein the step of (iv) comprises the steps of:

reading a P(y) which corresponds to the failed datum D(b, y);

reading other data corresponding to the P(y); and calculating the failed datum D(b,y) by an XOR of the P(y) and other corresponding data

15. A method for tolerating failure of two or more disks in a disk array, comprising the steps of:

assigning m data segments respectively into n selective disks of said disk array, each of said m data segments having p data blocks, wherein m is a total number of said data segments, n is a total number of said selective disks, and p is a total number of said data blocks;

generating n first parity blocks according to said m data segments based on a first computing rule;

generating n+1 second parity blocks according to said m data segments based on a second computing rule; and restoring each of data blocks of two or more disks in said disk array by using said first and second parity blocks when said two or more disks fail, wherein the restoring step comprises:

(i) setting a parameter y=b−a−1, wherein 'b' and 'a' respectively represent disk numbers of said two failed disks, and 'a' is less than 'b;'

(ii) performing a first operation to obtain k=((a+y) mod p), wherein p is a prime number;

(iii) reconstructing a data block D(a,y) of said failed disk 'a' using a first parity block Q(k);

(iv) reconstructing a data block D(b,y) of said failed disk 'b' using a second parity block P(y);

(v) performing a second operation to obtain y=((y+(b−a)) mod p); and (vi) repeating from step (ii) to step (v) until all data blocks of said two failed disks are reconstructed.

16. The method according to claim 15, wherein each of said n first parity blocks is computed by selecting an exclusive data block out of each of said m data segments according to said first computing rule, and some of said n+1 second parity blocks are computed by selecting an exclusive data block out of each of said m data segments while the other of said n+1 second parity blocks are computed by selecting an exclusive data block out of each of m−1 selective data segments from said m data segment according to said second computing rule.

* * * * *